US006980867B2

(12) United States Patent
Kito et al.

(10) Patent No.: US 6,980,867 B2
(45) Date of Patent: Dec. 27, 2005

(54) FRYER FOR COMMERCIAL USE

(75) Inventors: Shoji Kito, Nagoya (JP); Akira Suzuki, Nagoya (JP); Motoharu Yamaguchi, Nagoya (JP)

(73) Assignee: Paloma Industries, Ltd., Nagoya (JP)

( * ) Notice: Subject to any disclaimer, the term of this patent is extended or adjusted under 35 U.S.C. 154(b) by 142 days.

(21) Appl. No.: 09/903,262

(22) Filed: Jul. 11, 2001

(65) Prior Publication Data

US 2002/0005119 A1 Jan. 17, 2002

(30) Foreign Application Priority Data

Jul. 14, 2000 (JP) ....................................... 2000-214487

(51) Int. Cl.[7] ................................................ A23L 1/00

(52) U.S. Cl. ............................ 700/1; 99/342; 702/177; 702/178

(58) Field of Search ................................ 700/1, 14–17, 700/21, 78–81, 83, 211; 99/324, 325, 336, 337, 342, 344; 702/177, 178; 299/507; 219/507

(56) References Cited

U.S. PATENT DOCUMENTS

| | | | | | |
|---|---|---|---|---|---|
| 4,437,159 | A | | 3/1984 | Waugh | 364/400 |
| 4,636,949 | A | * | 1/1987 | Longabaugh | 700/90 |
| 4,663,710 | A | | 5/1987 | Waugh et al. | 364/400 |
| 4,672,540 | A | | 6/1987 | Waugh et al. | 364/400 |
| 4,858,119 | A | | 8/1989 | Waugh et al. | 364/400 |
| 4,864,498 | A | * | 9/1989 | Pasquini et al. | 700/90 |
| 4,884,626 | A | * | 12/1989 | Filipowski | 165/231 |
| 4,918,293 | A | * | 4/1990 | McGeorge | 219/506 |
| 5,186,097 | A | * | 2/1993 | Vaseloff et al. | 99/330 |
| 5,331,575 | A | * | 7/1994 | Koether et al. | 364/557 |
| 5,438,180 | A | * | 8/1995 | Eisenbrandt et al. | 219/492 |
| 5,534,680 | A | * | 7/1996 | Kadwell et al. | 219/505 |
| 5,875,430 | A | * | 2/1999 | Koether | 705/1 |
| 5,942,269 | A | * | 8/1999 | Casey et al. | 426/233 |
| 5,964,211 | A | * | 10/1999 | Sargunam et al. | 126/19 R |
| 6,255,630 | B1 | * | 7/2001 | Barnes et al. | 219/486 |
| 6,374,079 | B1 | * | 4/2002 | Hsu | 455/11.1 |
| 6,509,551 | B2 | * | 1/2003 | Metcalfe et al. | 219/492 |
| 2002/0005121 | A1 | * | 1/2002 | Suzuki | 99/403 |
| 2002/0005401 | A1 | * | 1/2002 | Meyer et al. | 219/413 |
| 2002/0005403 | A1 | * | 1/2002 | Suzuki | 219/506 |
| 2002/0082924 | A1 | * | 6/2002 | Koether et al. | 705/15 |
| 2003/0010043 | A1 | * | 1/2003 | Ferragut | 62/126 |

FOREIGN PATENT DOCUMENTS

| | | | | | |
|---|---|---|---|---|---|
| EP | 0285056 | A2 | | 10/1988 | |
| GB | 2318650 | A | | 4/1998 | |
| JP | 408228920 | A | * | 9/1996 | A47J/27/00 |
| JP | 08332148 | A | * | 12/1996 | A47J/27/00 |
| WO | WO9911978 | | | 3/1999 | |

* cited by examiner

*Primary Examiner*—Paul L. Rodriguez
*Assistant Examiner*—Sean Shechtman
(74) *Attorney, Agent, or Firm*—Pearson & Pearson, LLP

(57) ABSTRACT

A fryer controller is provided with a calendar function. In addition, a maintenance execution time is set for each maintenance item by operating a switch on an operating panel 16. When the maintenance execution time reaches a preset time, an asterisk * is displayed on a display portion 18 of the operating panel 16. In this way, a maintenance schedule is precisely managed.

2 Claims, 7 Drawing Sheets

FRYER FOR COMMERCIAL USE

BACKGROUND OF THE INVENTION

1. Field of the Invention

The present invention relates to a cooking utensil such as a fryer for heating and cooking a food by using predetermined heating means.

2. Description of the Prior Art

For example, a fryer is used to perform frying by putting a food in an oil vessel comprising heating means such as a pulse burner. Such a fryer requires maintenance such as cleaning or oil leakage check at stated cycles. Conventionally, the maintenance has been managed in accordance with a schedule (such as a schedule on paper or management data input to a personal computer) prepared by a user's self.

There are a plenty of maintenance items, and it is required to execute maintenance at a different cycle for each item. Thus, when a schedule is managed manually, there is a danger that a manager forgets the schedule when the time of maintenance has come. Therefore, there has been a problem that maintenance is not performed at a proper time as scheduled, which makes the execution time inaccurate

SUMMARY OF THE INVENTION

The present invention has been made in order to solve the foregoing problem. It is an object of the present invention to provide a cooking utensil capable of precisely managing a maintenance schedules and reliably executing maintenance at the managed schedule.

According to a first aspect of the present invention, there is provided a cooking utensil for cooking a food by using predetermined heating means, said cooking utensil comprising:

maintenance time setting means capable of arbitrarily setting a time for executing maintenance; and informing means for informing the execution time set by the maintenance time setting means.

According to a second aspect of the present invention, in addition to an advantageous effect of the first aspect, there is provided a cooking utensil, wherein the execution time is defined as a period when a standard date set in a predetermined cycle based on a calendar function has expired to execute maintenance regularly.

According to a third aspect of the present invention, in addition to an advantageous effect of the first or second aspect, there is provided a cooking utensil, wherein the execution time is defined as a time when a cumulative value of the operating time of the heating means has reached a predetermined standard time to execute maintenance more appropriately according to the actual using condition of a cooking utensil.

According to a fourth aspect of the present invention, in addition to an advantageous effect of any of the first to third aspects, there is provided a cooking utensil, wherein the execution time is defined as a time when a cumulative value of the number of times of operation of the heating means has reached a predetermined standard number of times to execute maintenance more appropriately according to the actual using condition of a cooking utensil.

According to a fifth aspect of the present invention, in addition to an advantageous effect of any of the first to fourth aspects, there is provided a cooking utensil, wherein the execution time can be set individually for each maintenance item to execute appropriate schedule management for each maintenance item.

According to a sixth aspect of the present invention, in addition to an advantageous effect of any of the first to fifth aspects, there is provided a cooking utensil, wherein the set execution time can be arbitrarily changed to flexibly set the maintenance execution period.

According to a seventh aspect of the present invention, in addition to an advantageous effect of any of the first to sixth aspects, there is provided a cooking utensil, wherein, after informing the execution time, said information is automatically called off by performing the corresponding maintenance work to reliably encourage to execute maintenance.

According to an eighth aspect of the present invention, in addition to an advantageous effect of the first to seventh aspects, there is provided a cooking utensil, wherein, after the information has been called off, a next execution time can be automatically set on the same cycle condition to save labor to set the next execution time after informing the present execution time.

According to a ninth aspect of the present invention, in addition to an advantageous effect of the first to eighth aspects, there is provided a cooking utensil, wherein the informing means displays a predetermined sign on an operating panel for the heating means to inform without any problem during normal cooking According to a tenth aspect of the present invention, in addition to an advantageous effect of the ninth aspect, there is provided a cooking utensil, wherein, a maintenance item can be displayed through a predetermined operation of a switch provided on the operating panel to rapidly recognize concrete item of maintenance by display of the predetermined sign.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiment of the present invention and, together with the general description given above and the detailed description of the preferred embodiment given below, serve to explain the principle of the present invention.

DETAILED DESCRIPTION OF THE INVENTION

Hereinafter, a preferred embodiment of the present invention will be described with reference to the accompanying drawings.

Figure 1:
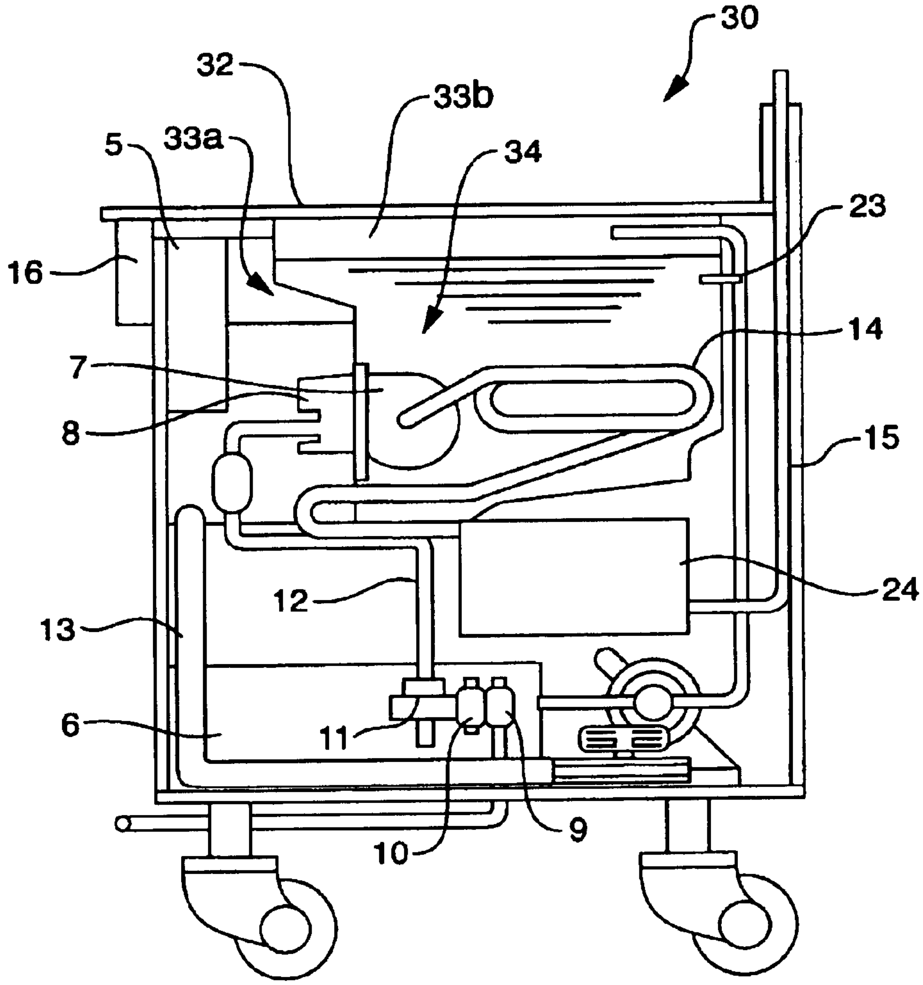
FIG. 1 is a side elevational view of a fryer.

FIG. 1 is a side elevational view of a commercial fryer 1 (hereinafter, referred to as "fryer") as an example of a cooking utensil. A fryer 30 is provided in a casing 32 with a pair of left and right oil vessels 33*a,* 33*b* filled with cooking oil (hereinafter, referred to as "oil") for frying a food; a pulse burner 34 that is a heating means for heating up the oil, provided in each oil vessel 33*a,* 33*b;* a controller 5 for mainly controlling combustion of the pulse burner 34 and an oil tank 6 for temporarily reserving oil in order to filtrate the oil contained in the oil vessels 3, 3.

The pulse burner 34 has a combustion chamber 7 formed in the oil vessel 33*b* and a mixing chamber 8 that communicates with the combustion chamber 7 outside of the oil vessel 33*b*. The mixing chamber 8 is connected to a gas pipe 12 for supplying a fuel gas provided with, from the upstream side, an intake solenoid valve 9, a main solenoid valve 10, and a gas governor 11. The mixing chamber 8 is connected to an air supply pipe 13 comprising a fan for supplying combustion air.

Further, the combustion chamber 7 is communicated with a tail pipe 14 extending through the oil vessel 33*b* and the tail pipe 14 is connected to an exhaust pipe 15, that opens to the outside of the fryer 30, via a de-coupler 24 at the outside of the oil vessel 33*b*.

Figure 2:
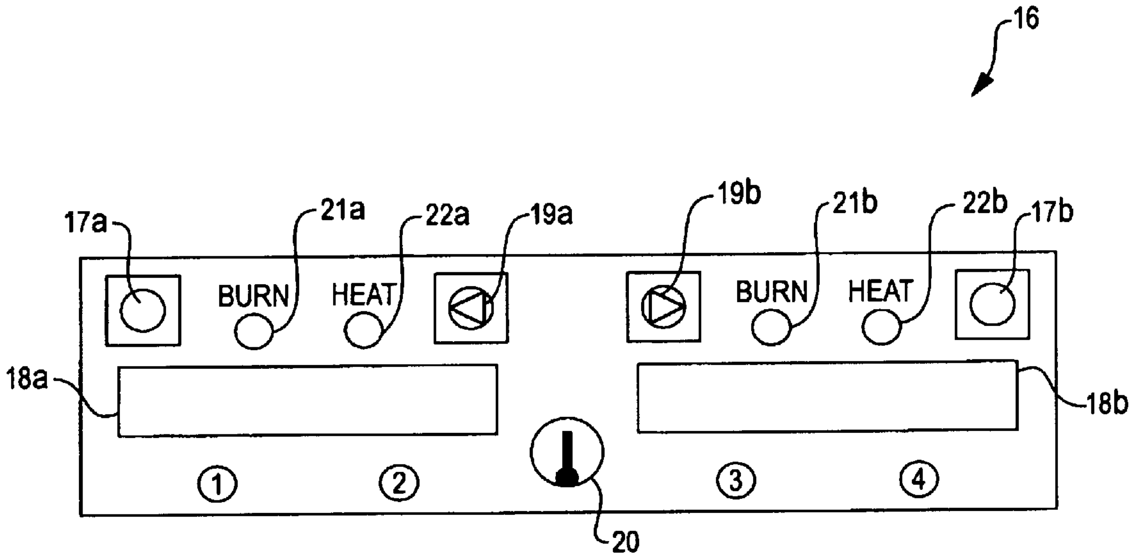
FIG. 2 is an illustrative view of an operating panel.

The controller 5 comprises an operating panel 16 at the front of a casing 32. FIG. 2 is a front view showing the operating panel 15. At the operating panel 16, there are provided operating switches 17*a,* 17*b;* display portions 18*a,* 18*b* for displaying the name of a food on the menu, temperature or the like; cooking start switches <1> to <4> located in pairs beneath each display portion 18*a,* 18*b* (hereinafter, referred to as a "switch =1>" or the like); and left and right feed switches 19*a,* 19*b,* for switching a display of the display portion 18*a,* 18*b* respectively, corresponding to each of the left and right oil vessels 33*a,* 33*b* and a thermometer switch 20 common to both of the oil vessels 33*a,* 33*b* is provided between the display portions 18*a* and 18*b*. Reference numerals 21*a,* 21*b* denote combustion lamps, and reference numerals 21*a,* 21*b* denote combustion demanding lamps. In addition, the controller 5 comprises a CPU (a central processing unit) for controlling operation of the fryer 30; a ROM having a control program stored therein; a RAN storing various types of control data; and an interface for data exchange. This CPU delivers a control command to each portion of the equipment in accordance with a program read out from the ROM, and performs processing according to data output from each portion of the equipment. A temperature sensor 23 provided at the oil vessel 33*b* and a variety of switches provided on the operating panel 16 are connected to the input side of the CPU. Each of the solenoid valves, a fan motor, various types of lamps and the like are connected to the output side of the CPU.

Therefore, in a normal mode, each switch is operated on the operating panel 16, thereby making it possible to implement normal operation control for selecting food, cooking or displaying an oil temperature. For example, when a left operating switch 17*a* is pressed, the pulse burner 4 operates to implement ON/OFF control for switching combustion and a combustion stop by opening and closing the main solenoid valve 10 based on a signal from the temperature sensor 23, and to maintain the oil temperature in the oil vessel 33*a* in a predetermined range. Here, on the display portion 18*a* a food on the menu (for example, potato or the like) is displayed. By pressing a feed switch 19*a,* a target food can be selected and displayed. Thereafter, when a switch <1> is pressed after putting a food in the oil vessel 33*a,* the counting of the preset cooking tame for the selected food is started. Then, when the cooking time terminates, the switch <1> blinks, and the alarm goes off, indicating that the cooking has terminated.

On the operating panel 16, apart from use in such a normal mode, use in a special mode is available to enable to set a timer or a temperature used in a normal mode, change of various names or the like, specifically, the special mode includes: a program mode for setting parameters used for cooking of each food; a setup mode for providing various types of settings such as displayed language setting, sound-level control, or temperature calibration; a maintenance informing mode for verifying what kind of maintenance should be performed and checking up on the completion when a maintenance time is informed in a normal mode; a maintenance time setting mode for setting time to inform maintenance; a cooking time adjustment mode for automatically measuring and adjusting a cooking time; and a boil-out mode for boiling the oil vessel 33*a,* 33*b*.

Figure 3A:
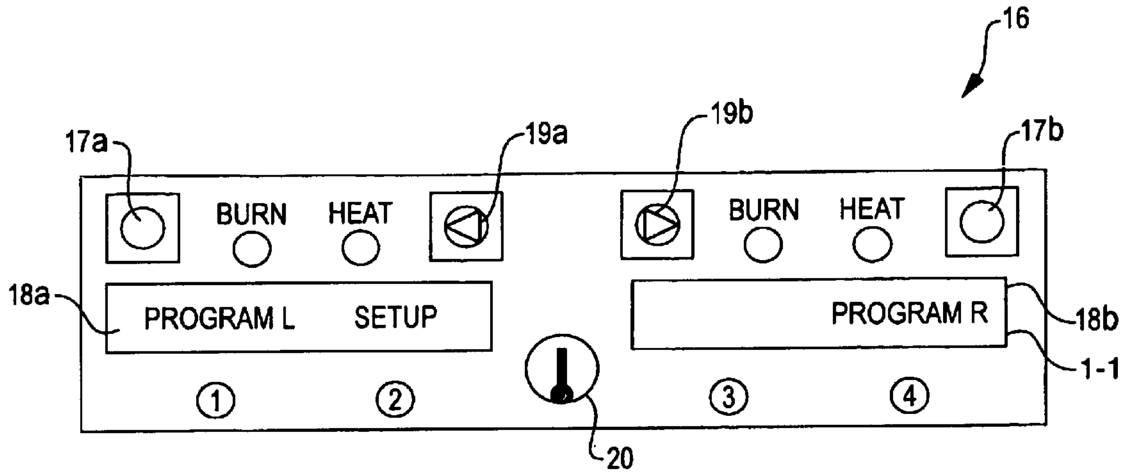
FIG. 3A is an illustrative view of an operating panel when a special mode selection screen 1—1 is displayed.
Figure 3B:
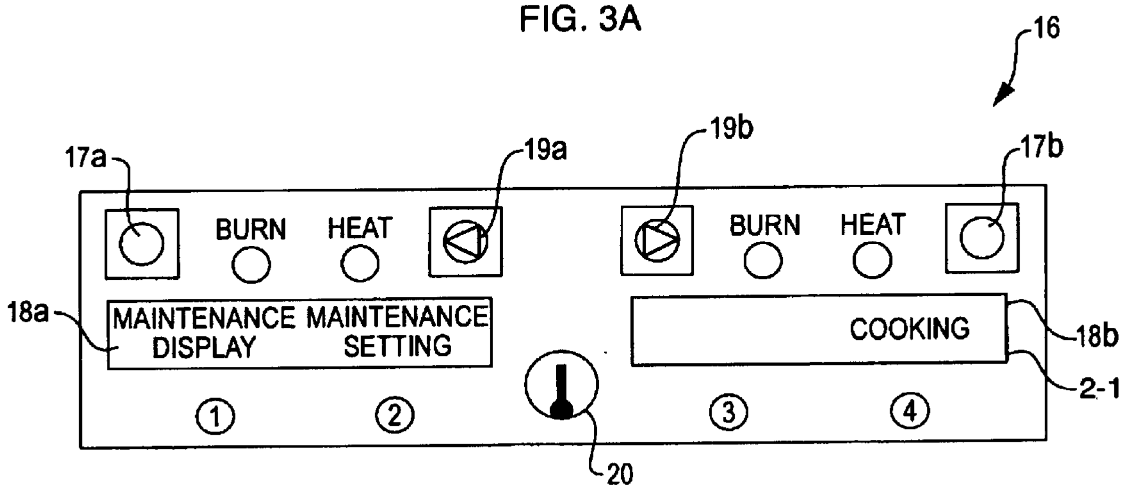
FIG. 3B is an illustrative view of an operating panel when a cooking mode selection a screen 2-1 is displayed.
Figure 3C:
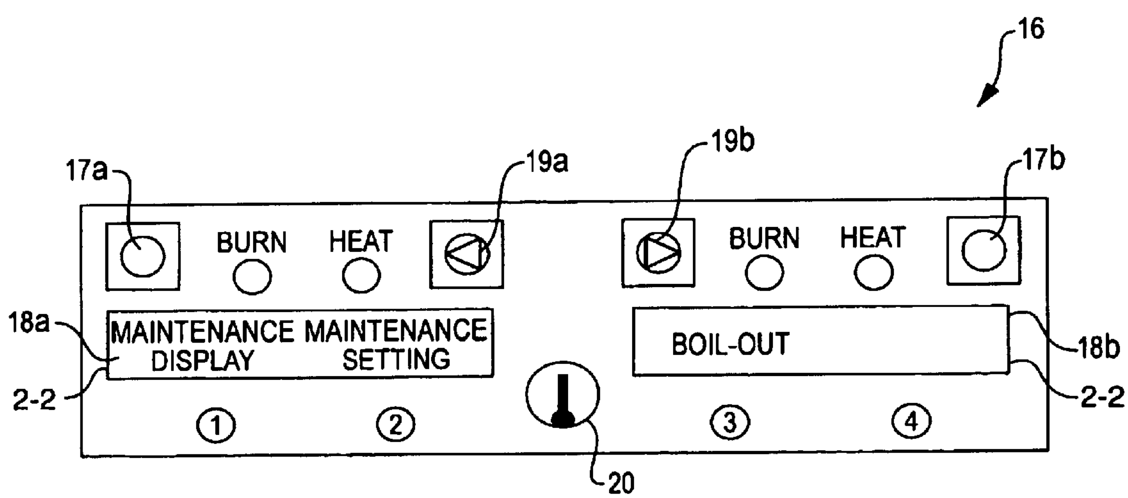
FIG. 3C is an illustrative view of an operating panel when a boil-out mode selection screen 2—2 is displayed.

During switching to any one of these modes, when the left and right feed switches 19*a,* 19*b,* are pressed from three seconds, a special mode selection screen 1—1 is displayed as shown in FIG. 3A. Then, when the right feed switch 19*b* is pressed, a special mode selection screen 2-1 shown in FIG. 3B or a special mode selection screen 2—2 shown in FIG. 3C is displayed according as the operating switch 17*b* is turned ON. That is, in a cooking time adjustment mode, a cooking timer is adjusted while actual operation is made. Thus, only in the case where switching to the special mode is established while the operating switch 17*b* is turned ON, the screen is displayed as shown in FIG. 3B. In a boil-out mode, cold or hot water is poured into the oil vessel 30, and is boiled. Thus, only in the case where switching to the special mode is established while the operating switch 17*b* is turned OFF, the screen is displayed as shown in FIG. 3C in order to prevent the boil-out mode from implementing when there is oil in the vessel 33*b.*

When any of the special mode selection screens 2-1 and 2—2 is displayed, a desired maintenance time setting mode is selected by pressing the switch <2> that corresponds to a display "maintenance setting" in the maintenance time setting mode. Hereinafter, procedures for setting a maintenance time will be described.

Figure 4A:
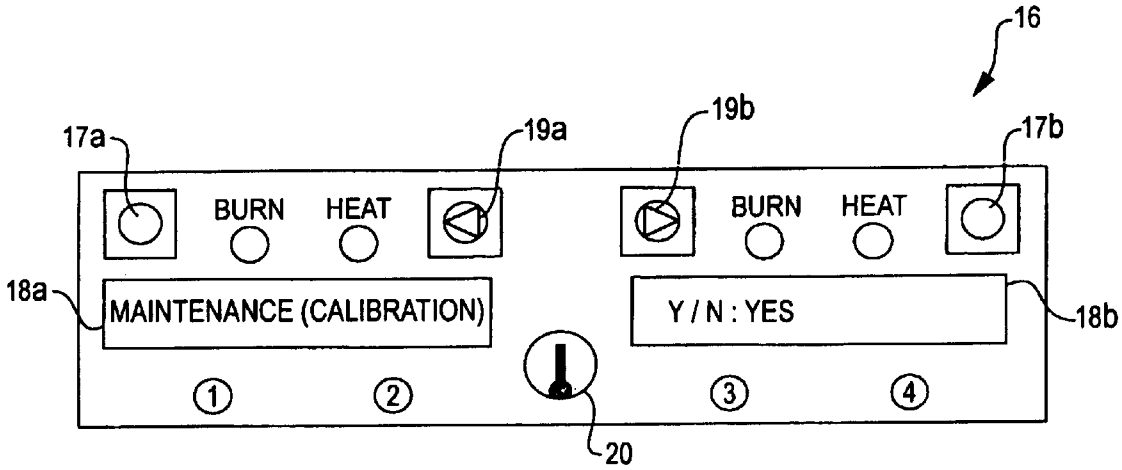
FIG. 4A is an illustrative view illustrating a display of an operating panel when a maintenance period may be set.
Figure 4B:
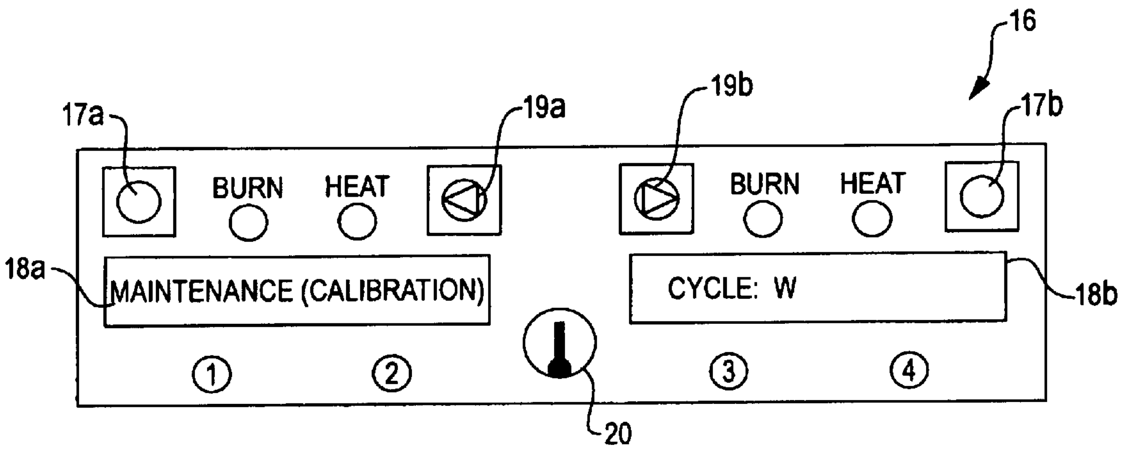
FIG. 4B is an illustrative view illustrating a display of an operating panel when a maintenance period frequency is set.

As described previously, a maintenance time setting mode is selected by pressing the switch <2> on the display shown in FIG. 3C. When the switch <1> or <2> is pressed, a message "maintenance (calibration)" is displayed on the left display portion 18*a,* as shown in FIG. 4A. On the right display portion 18*b,* there appears a display "Y/N: YES", which prompts a user to select whether or not information is performed when a maintenance time has come. Therefore, "YIN: YES" and "Y/N: NO" are sequentially displayed by pressing the switch <4>. Informing the maintenance time is selected by displaying "YES".

Next, when the switch <3> is pressed, "Cycle:W" is displayed on the right display portion 18*b* as shown in FIG.

Figure 4C:
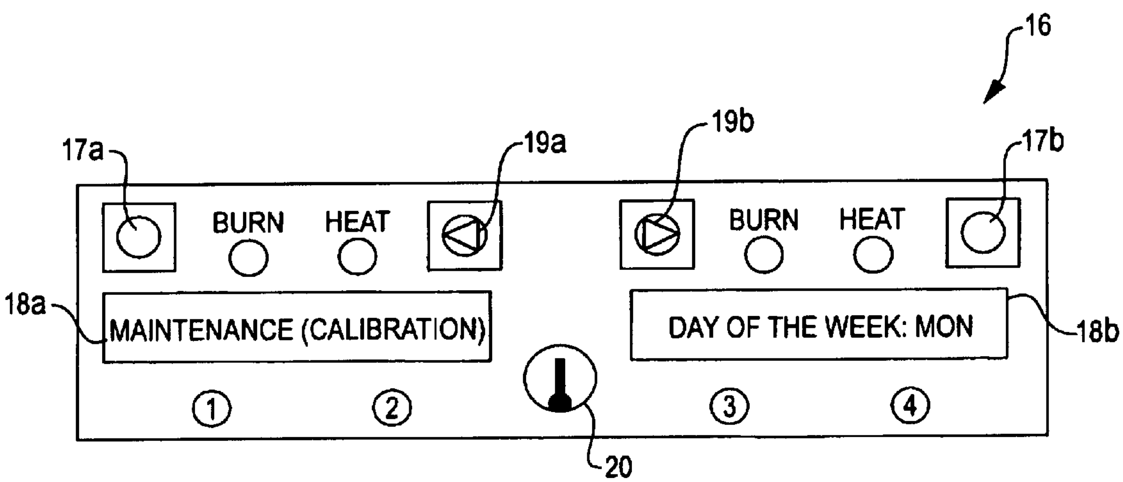
FIG. 4C is an illustrative view illustrating a display of an operating panel when a day of the week of the maintenance period is set.

4(B). When the switch <4> is pressed, "Cycle:W", "Cycle:M", "Cycle:Q", "Cycle:H", and "Cycle:Y" are cyclically displayed in this order (where W denotes one week, M denotes one month; Q denotes three months; H denotes a half year; and Y denotes one year for the cycle). For example, when the switch <3> is pressed after "W" has been displayed, "Day of the week:SUN" is displayed on the right display portion. When the switch <4> is pressed in this state, "MON", "TUE", "WED", "THU", "FRI". "SAT", and "SUN" are cyclically displayed in this order for a day of the week. For example, when "MOM" is displayed as shown in FIG. 4C, every Monday is set as a standard date to perform the calibration based on a calendar. In this state, a thermometer switch 20 functions as a switch for storing the information item setting. When the thermometer switch 20 is pressed, the standard date is stored. Otherwise, a standard date can be set for every month, three months, half year, or year by operating the switches <3> and <4> in a similar way to the above procedures. Even after a maintenance time has been set, the setting can be changed arbitrarily by displaying a special mode selection screen similarly.

Figure 5:
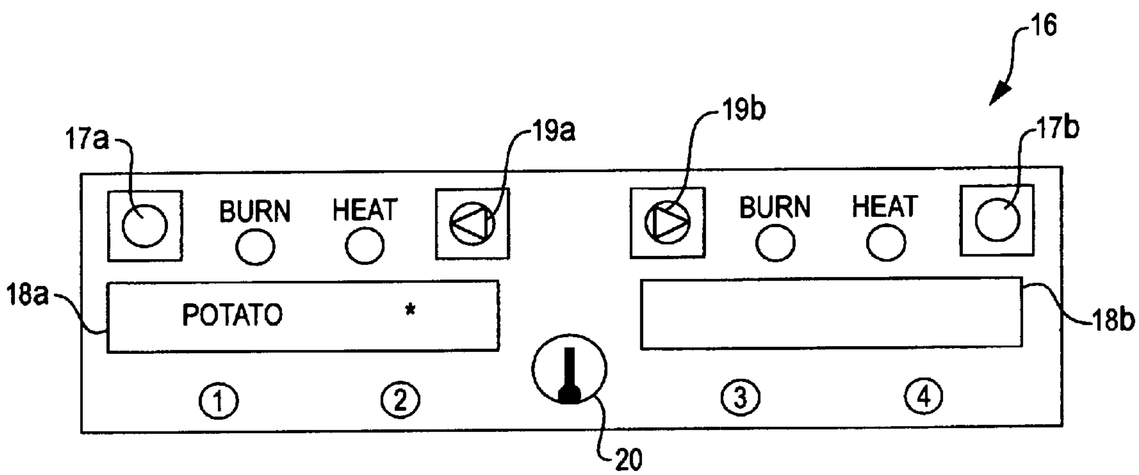
FIG. 5 is an illustrative view illustrating a display of an operating panel when a maintenance period is informed.

After a standard date is thus set by the maintenance time setting means, when the fryer 30 is powered ON on the standard day or later, or when the standard day has come while the fryer 30 is operating, the necessity of maintenance is informed on the operating panel 16. Specifically, as shown in FIG. 5, in a normal mode, an asterisk * blinks as informing means at the end of the left display portion 18. Therefore, in the case where this display appears, any of the special mode selection screens 2-1 and 2—2 is displayed by operating the left and right feed switches 19*a,* 19*b,* as described previously. Then, pressing the switch <1> that corresponds to "maintenance display" makes it possible to enter a maintenance informing mode. Each specific item name for which maintenance should be performed is displayed at the display portion 18 together with a cursor. For example, "Calib" for calibration, "Clean" for fryer cleaning, "oil" for oil leakage check or the like is displayed.

The asterisk * is designed to be automatically erased when all the items displayed in the maintenance informing mode are erased (by pressing the switch <4> at the cursor position). At the same time, the controller 5 sets a next standard date according to the date when all items displayed on the maintenance informing mode are erased and a preset cycle. For example, in the case where the informing cycle is set to one week, it is automatically updated to a value obtained by adding 7 to the date of the erasure; or in the case where the informing period is set to one month, it is automatically updated to a value obtained by adding 1 to the month of the erasure.

As has been described above, according to the above embodiment, the fryer 30 comprises: maintenance time setting means capable of arbitrarily setting an execution time for each maintenance item; and informing means for informing the execution time set by the maintenance time setting means, thereby enabling maintenance schedule management by the fryer 30 itself, and the information is automatically performed. Therefore, the schedule is precisely managed, and a maintenance can be executed at a proper time informed in accordance with the managed schedule, thereby a maintenance delay or cycle inaccuracy can be prevented. In addition, only one initial maintenance time setting suffices, thus eliminating a worker doing cumbersome work involved in schedule management.

Further, the execution time is defined as a time when a standard date set at a predetermined cycle based on a calendar function has expired, thereby maintenance can be performed cyclically in accordance with the calendar.

On the other hand, an execution time can be set individually for each maintenance item, and thus, a proper execution time can be set according to each maintenance item. In addition, a temporarily set execution time can be arbitrarily changed, thereby making it possible to flexibly set the execution time.

After the execution time has been informed, the corresponding maintenance work is performed, thereby the information marked with the asterisk * is automatically called off. Thus, if a maintenance is not performed, the information is continued, and reliable execution of the maintenance as prompted. In particular, informing means is the display of the asterisk *, and thus, the information can be performed on the display portion 18*a,* 18*b* without any problem during normal cooking.

Further, after the display of the asterisk * has been called off, a next execution time can be automatically set in the same cycle, thus eliminating cumbersome work for the setting of the next execution time.

After the asterisk * has been displayed, a special mode selection screen is displayed by operating the feed switches 19*a,* 19*b,* thereby making at possible to display a specific maintenance item. Thus, even if the information displaying only the asterisk * occurs, a maintenance item to be executed can be recognized speedily.

In the above embodiment, although the description has been given with the example when maintenance is managed by using a calendar function irrespective of an actual using state of the fryer 30, management based on the using state of the fryer 30 can be performed. Hereinafter, although a description of each modified example will be given, basic operating procedures for the operating panel 16 itself are similar to those in the above embodiment except that the settings at the execution time in a maintenance time setting mode are different. A brief description will be given with reference to the corresponding flow chart.

Figure 6:
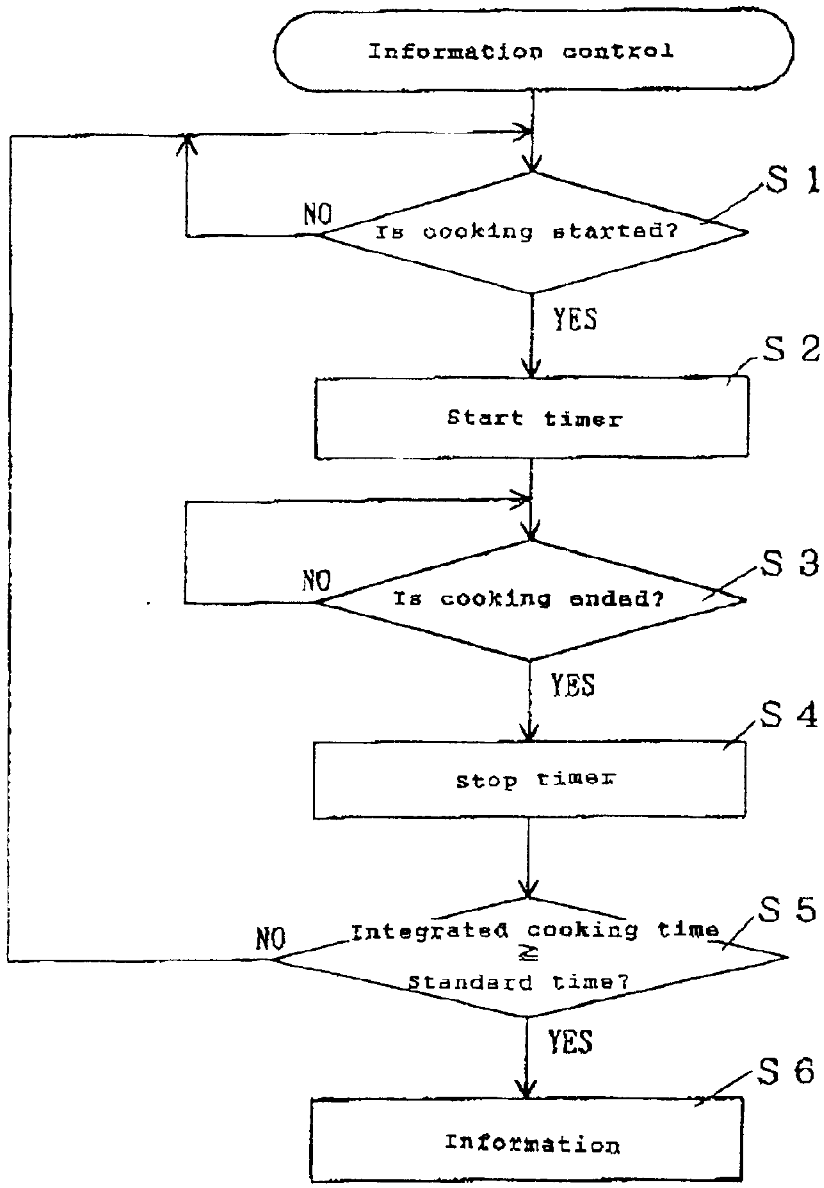
FIG. 6 is a flow chart showing information control based on a cooking time.

For example, FIG. 6 shows an example when a maintenance schedule is managed according to a cooking time) operation time of the pulse burner 34). At the step S1, the pulse burner 34 starts combustion, and cooking is started. At the step S3, the end of cooking is checked. At the step S4, the timer is stopped, and the cooking time is integrated. When it is judged at the step S5 that the integrated cooking time reaches a preset standard time (for example, 500 hours) or more, the information displaying the asterisk * is performed at the step S6. Therefore, in the maintenance time setting mode, a maintenance item managed in accordance with the cooking time is selected, and the standard time to be informed may be set.

Figure 7:
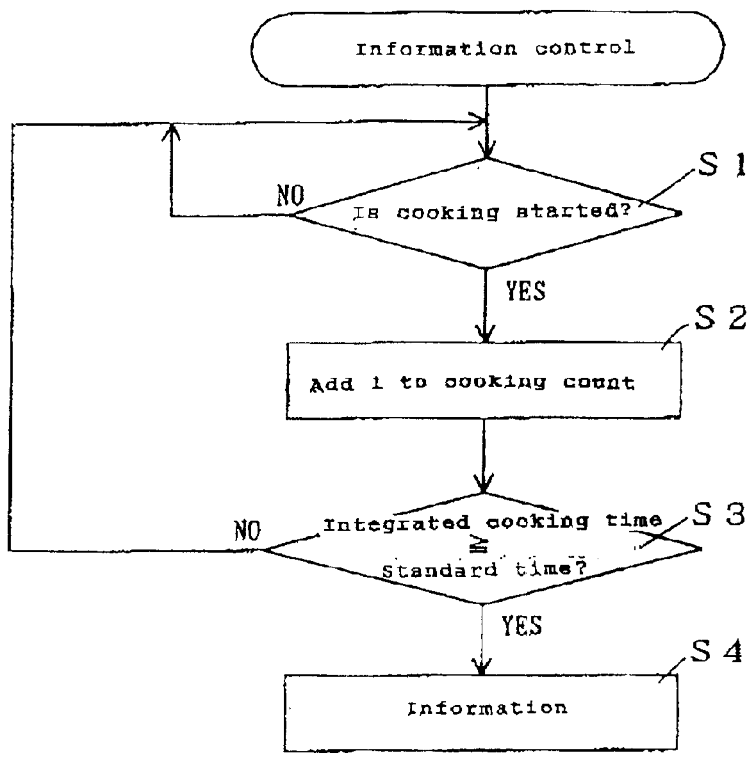
FIG. 7 is a flow chart showing information control based on the cooking count.

FIG. 7 shows an example when a maintenance schedule is managed according to the cooking count (the number of operating the pulse burner 34). At the step 1, the pulse burner 34 starts combustion, and cooking is started. At the step S2, 1 is added to a memory of the controller 5 every cooking. At the step S3, if the integrated cooking count reaches a preset standard count (for example, 500 counts) or more, the information displaying the asterisk * is performed at the step S4. Therefore, in the maintenance time setting mode, a maintenance item managed in accordance with the cooking count is selected, and the standard count to be informed may be set.

As has been described above, in the above modified example, a maintenance execution time is informed according to an actual using state of the fryer 30, thus enabling more proper maintenance according to the using state. Of course, in the above modified example as well, the cooking time or cooking count can be arbitrarily reset for each maintenance item. In addition, maintenance work corresponding to the contents of the information is performed, thereby making it possible to automatically call off the information, and automatically update the contents of the next information after call off the information.

Otherwise, the informing means may include an alarm, lamp, voice or the like or a combination thereof without being limited to the above display of the asterisk.

Advantageous Effect of the Invention

According to a first aspect of the present invention, there is provided; maintenance time setting means capable of arbitrarily setting a time for executing maintenance; and informing means for informing the execution time set by the maintenance time setting means, thereby making it possible for a cooking utensil itself to manage a maintenance schedule, and thereby the information is automatically performed. Therefore, a schedule can be precisely managed, and maintenance can he executed at a proper time informed in accordance with the managed schedule, thereby a maintenance delay or cycle inaccuracy can be prevented In addition, only one initial maintenance time setting suffices, thus eliminating a worker doing cumbersome work involved in schedule management.

According to a second aspect of the present invention, in addition to an advantageous effect of the first aspect, the execution time is defined as a time when a standard date set in a predetermined cycle based on a calendar function has expired, thereby maintenance can be performed cyclically in accordance with a calendar.

According to a third aspect of the present invention, in addition to an advantageous effect of the first or second aspect, the execution time is defined as a time when a cumulative value of the operating time of the heating means has reached a predetermined standard time, thereby maintenance can be performed more properly according to the actual using state of the cooking utensil.

According to a fourth aspect of the present invention, in addition to an advantageous effect of any of the first to third aspects, the execution time is defined as a time when a cumulative value of the number of times of the operation of the heating means has reached a predetermined standard number of times, thereby maintenance can be performed more properly according to the actual using state of the cooking utensil.

According to a fifth aspect of the present invention, in addition to an advantageous effect of any of the first to fourth aspects, the execution time can be set individually for each maintenance item, thereby a proper schedule management can be performed for each maintenance item.

According to a sixth aspect of the present invention, in addition to an advantageous effect of any of the first to fifth aspects, the set execution time can be arbitrarily changed, thereby the maintenance execution time can be set flexibly.

According to a seventh aspect of the present invention, in addition to an advantageous effect of any of the first to sixth aspects, after informing the execution time, said information is automatically called off by performing the corresponding maintenance work, thereby, if a maintenance is not performed, the information is continued, prompting a worker to execute the maintenance.

According to an eighth aspect of the present invention, in addition to an advantageous effect of the first to seventh aspects, after the information has been called off, a next execution time can be automatically set on the same cycle condition, thereby cumbersome work involved in setting of the next execution time can be eliminated after the execution time has been informed.

According to a ninth aspect of the present invention, in addition to an advantageous effect of the first to eighth aspects, the informing means displays a predetermined sign on an operating panel for the heating means, thereby information can be performed without any problem during normal cooking.

According to a tenth aspect of the present invention, in addition to an advantageous effect of the ninth aspect, after the predetermined sign has been displayed, a maintenance item can be displayed through a predetermined operation of a switch provided on the operating panel, thereby, even if information displaying a predetermined sign occurs, a maintenance item can be recognized speedily.

Additional advantages and modifications will readily occur to those skilled in the art. Therefore, the invention in its broader aspect is not limited to the specific details and representative embodiment shown and described herein. Accordingly, various modifications may be made without departing from the spirit or scope of the general inventive concept as defined by the appended claims and their equivalents.

What is claimed is:

1. A commercial fryer for cooking a food by using predetermined heating means, said commercial fryer comprising:

(a) means for setting a maintenance time of each of a plurality of maintenance items wherein a user arbitrarily sets a weekly or monthly time cycle of maintenance for executing each of said maintenance items and a calendar date for a standard date of said time cycle;

(b) means for tracking calendar dates and determining when said maintenance time for each of said plurality of maintenance items occurs;

(c) means for informing said user when each calendar date occurs for executing each one of said maintenance items set by said maintenance time setting means, said informing means displays a predetermined sign on an operating panel of said commercial fryer; and (d) means for displaying each one of said user informed maintenance items after said predetermined sign is displayed on said operating panel.

2. A cooking utensil as recited in claim 1, wherein after informing said user of the execution time, said execution time is automatically removed by performing the corresponding one of said maintenance items.

* * * * *